US012790227B2

(12) United States Patent

Jung et al.

(10) Patent No.: US 12,790,227 B2

(45) Date of Patent: Nov. 10, 2026

(54) MANUFACTURING METHOD AND MANUFACTURING APPARATUS FOR CALCIUM FORMATE

(71) Applicant: CHUNG ANG UNIVERSITY INDUSTRY ACADEMIC COOPERATION FOUNDATION, Seoul (KR)

(72) Inventors: Hae Won Jung, Chungcheongnam-do (KR); Cheol Hyun Kim, Gyeonggi-do (KR); Hyun Choi, Gyeonggi-do (KR); Jung Hyun Jin, Seoul (KR); Sung Ho Yoon, Seoul (KR); Ha Young Yoon, Incheon (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 632 days.

(21) Appl. No.: 18/038,516

(22) PCT Filed: Nov. 24, 2021

(86) PCT No.: PCT/KR2021/017439

§ 371 (c)(1),
(2) Date: May 24, 2023

(87) PCT Pub. No.: WO2022/114794

PCT Pub. Date: Jun. 2, 2022

(65) Prior Publication Data

US 2024/0109784 A1 Apr. 4, 2024

(30) Foreign Application Priority Data

Nov. 24, 2020 (KR) ........................ 10-2020-0158835

(51) Int. Cl.
*C01F 11/46* (2006.01)
*B01J 23/46* (2006.01)

(52) U.S. Cl.
CPC ............. *C01F 11/46* (2013.01); *B01J 23/462* (2013.01); *B01J 23/468* (2013.01)

(58) Field of Classification Search
CPC ......... C01F 11/46; B01J 23/462; B01J 23/468
See application file for complete search history.

(56) References Cited

FOREIGN PATENT DOCUMENTS

| | | | |
|---|---|---|---|
| CN | 104387255 A | | 3/2015 |
| CN | 104722189 A | * | 6/2015 |

(Continued)

OTHER PUBLICATIONS

English machine translation of DE102012112060 (2012).*

(Continued)

*Primary Examiner* — Richard M Rump

(74) *Attorney, Agent, or Firm* — Harness, Dickey & Pierce, P.L.C.

(57) ABSTRACT

The present invention relates to a manufacturing method and a manufacturing apparatus for calcium formate and, more particularly, to a manufacturing method and a manufacturing apparatus for calcium formate, wherein the formic acid-amine adduct prepared in a process using hydrogenation of carbon dioxide is reacted with a calcium compound, whereby calcium formate can be manufactured and separated in a simple process while excluding complicated separation processes and co-bases required by conventional formic acid manufacturing processes, with the resultant improvement of economical benefit and efficacy in the process.

9 Claims, 3 Drawing Sheets

(56) References Cited

FOREIGN PATENT DOCUMENTS

| | | | |
|---|---|---|---|
| DE | 102012112060 | A1 | 6/2013 |
| KR | 10-2020-0057644 | A | 5/2020 |

OTHER PUBLICATIONS

English machine translation of KR20200057644 (2020).*
English machine translation of CN104722189A (2015).*
International Search Report from corresponding PCT Application No. PCT/KR2021/017439, dated Mar. 10, 2022.
Gunasekar, G. H., et al.; "Eco-friendly upconversion of limestone into value-added calcium formate", Green Chemistry, Jun. 29, 2020, vol. 22, No. 15, pp. 4995-5001.
Yun, T. S., et al.; "Design and analysis of calcium formate synthesis process", Abstracts presented at KSIEC Meeting, Oct. 28, 2020, vol. 2020, p. 418, #P-630.

* cited by examiner

MANUFACTURING METHOD AND MANUFACTURING APPARATUS FOR CALCIUM FORMATE

CROSS-REFERENCE TO RELATED APPLICATIONS

This application is a national phase application of PCT Application No. PCT/KR2021/017439, filed on Nov. 24, 2021, which claims the benefit and priority to Korean Patent Application No. 10-2020-0158835, filed on Nov. 24, 2020. The entire disclosures of the applications identified in this paragraph are incorporated herein by references.

TECHNICAL FIELD

The present invention relates to a method and an apparatus for preparing calcium formate, and more specifically, to a method and an apparatus for preparing calcium formate in which, by reacting a calcium compound with a formic acid-amine adduct prepared in a process using hydrogenation of carbon dioxide, calcium formate can be prepared and separated by a simple process, eliminating the complex separation process and auxiliary base required in a conventional formic acid manufacturing process, thereby improving the economy and efficiency of the process.

BACKGROUND ART

Formic acid and its salts are versatile compounds. Calcium formate, in particular, is a very low-toxicity compound that is useful in a variety of applications, including tile additives, feed additives, concrete curing accelerators and exhaust desulfurization additives.

The primary application of calcium formate is an additive to organic animal feeds, where it acts as an acidifier to promote animal intestinal health. As meat production is steadily increasing, the market for calcium formate is expected to grow along with the demand for feed products fed to livestock and poultry across the globe. In addition, the low temperatures during the winter months increase the curing time of concrete, and the addition of calcium formate to concrete can accelerate the curing process and prevent construction delays. In addition, studies have shown that the use of calcium formate as an exhaust gas desulfurization additive increases desulfurization efficiency.

Commercial calcium formate is produced as a byproduct in the manufacture of trimethylolpropane, and despite its many functions, its use is limited by its high price due to its limited supply.

On the other hand, Korean Patent Laid-Open Publication No. 10-2020-0057644 discloses a method for producing formic acid by a hydrogenation reaction of carbon dioxide, which includes a process for hydrogenation of $CO_2$ and separation of formic acid using triethylamine (see FIG. 2), wherein an amine exchange process is essentially required to separate triethylamine from triethylammonium formate by adding butylimidazole before the pyrolysis process. This is because triethylamine exists as an azeotrope with formic acid, which is in a stable state and cannot be separated by pyrolysis. Therefore, butyl imidazole must be added to separate the triethylamine, which results in an ongoing additional cost. Furthermore, the pyrolysis process requires a lot of thermal energy and can be complicated by multiple distillation columns, and the n-butyl imidazole added during the amine exchange is not only expensive but also is required continuously, which increases the cost of the process.

Accordingly, there has been a demand for a method and apparatus for preparing calcium formate that can prepare and separate calcium formate in a simple process by excluding complex separation processes and auxiliary bases required in conventional formic acid manufacturing processes, thereby improving the economy and efficiency of the process.

CONTENTS OF THE INVENTION

Problems to be Solved

The purpose of the present invention is to provide a method and an apparatus for preparing calcium formate in which, by reacting a calcium compound with a formic acid-amine adduct prepared in a process using hydrogenation of carbon dioxide, calcium formate can be prepared and separated by a simple process, eliminating the complex separation process and auxiliary base required in a conventional formic acid manufacturing process, thereby improving the economy and efficiency of the process.

Technical Means

In order to achieve the technical purpose, the present invention provides a method for preparing calcium formate, comprising a preparation step of preparing a formic acid-amine adduct using a hydrogenation reaction of carbon dioxide; a calcium formate production step of reacting the formic acid-amine adduct and a calcium compound to produce calcium formate and an amine and a separation step of separating the prepared calcium formate.

In another aspect, the present invention provides an apparatus for preparing calcium formate, comprising a calcium formate production unit for producing calcium formate and an amine by reacting a formic acid-amine adduct and a calcium compound; and a separation unit for separating the prepared calcium formate.

Effect of the Invention

By using the method and the apparatus for preparing calcium formate of the present invention, calcium formate can be prepared and separated in a simple process by eliminating the complex separation process and auxiliary base required in the conventional formic acid manufacturing process, and the catalytic separation procedure is not required, and long-term stable operation is possible, thereby improving the economy and efficiency of the process.

In addition, when using the waste product desulfurized gypsum ($CaO@CaSO_4$) as a calcium compound, $CaSO_4$ separated from $CaO@CaSO_4$ can be used as a separate resource, which is very useful industrially.

CONCRETE MODE FOR CARRYING OUT THE INVENTION

The present invention is explained in more detail below.

The method for preparing calcium formate of the present invention comprises a preparation step of preparing a formic acid-amine adduct using a hydrogenation reaction of carbon dioxide; a calcium formate production step of reacting the formic acid-amine adduct and a calcium compound to produce calcium formate and an amine and a separation step of separating the prepared calcium formate.

The formic acid-amine adduct used in the present invention may be prepared or manufactured in the preparation step of preparing a formic acid-amine adduct, and said preparation step may comprise: a carbonation step of preparing ammonium bicarbonate by reacting carbon dioxide, amine and water; and a hydrogenation step of reacting the ammonium bicarbonate with hydrogen in the presence of a catalyst to form a formic acid-amine adduct.

Figure 1:
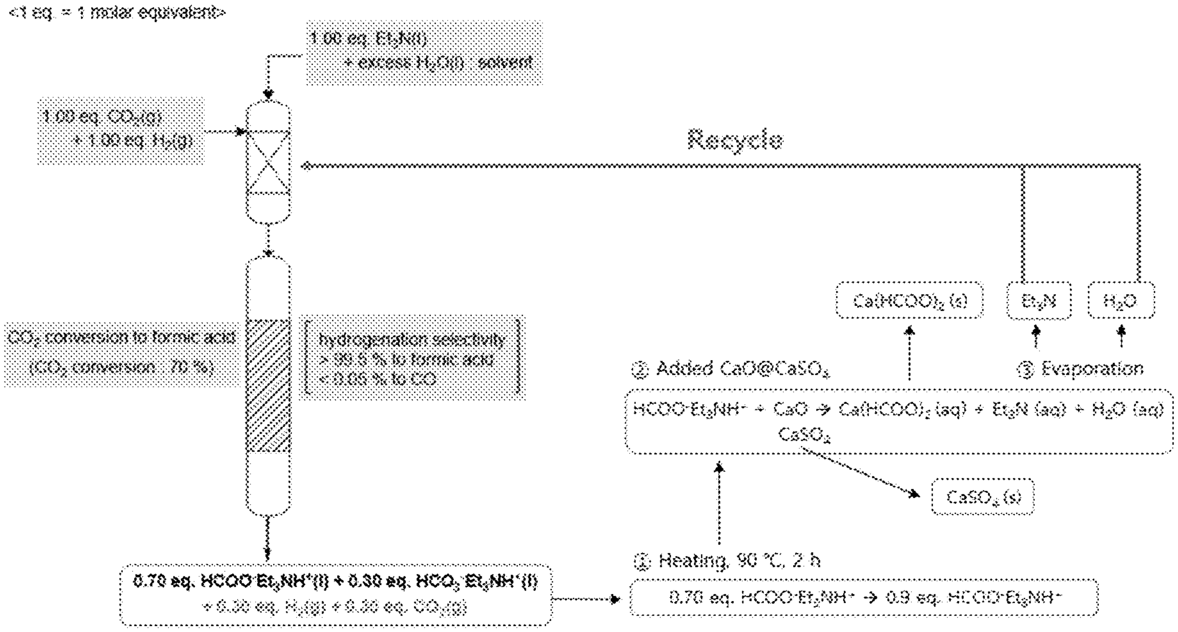
FIG. 1 is a schematic illustration of a method for preparing calcium formate according to an embodiment of the present invention.
Figure 2:
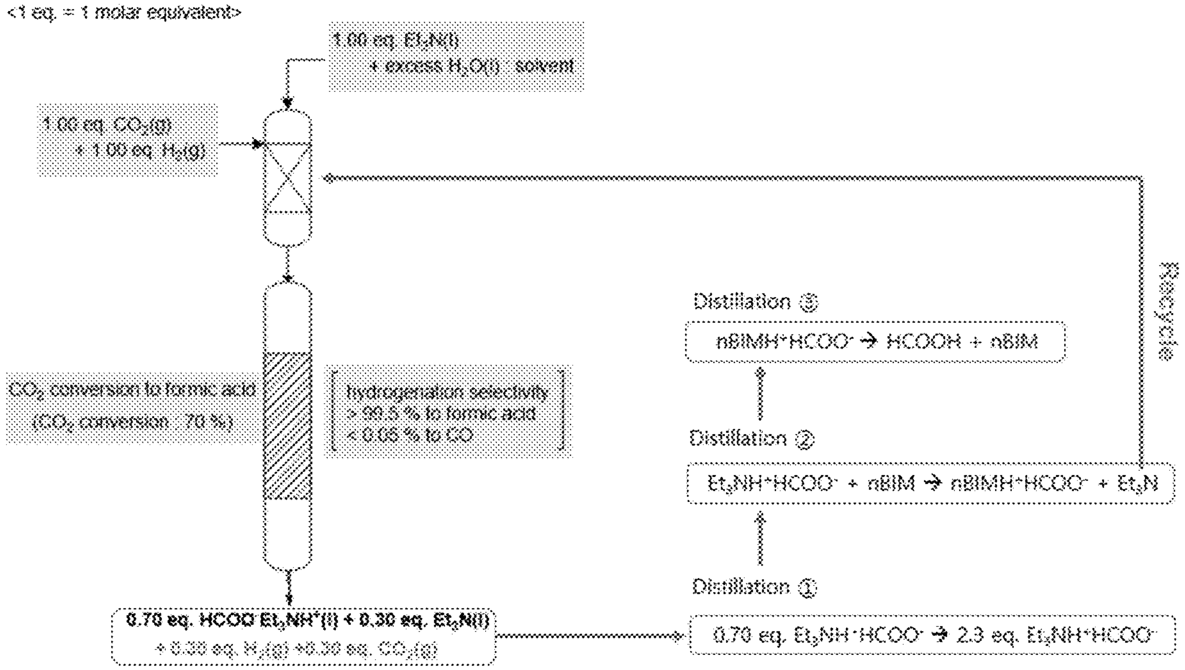
FIG. 2 is a schematic illustration of a manufacturing process for formic acid according to one embodiment of the prior art.

Thus, in one embodiment, the method for preparing calcium formate of the present invention may comprise: a carbonation step of preparing ammonium bicarbonate by reacting carbon dioxide, amine and water; a hydrogenation step of reacting the ammonium bicarbonate with hydrogen in the presence of a catalyst to form a formic acid-amine adduct and a separation step of separating the prepared calcium formate. Referring to FIG. 1, it can be understood that the method for preparing calcium formate of the present invention essentially comprises a carbonation step, a hydrogenation step, a calcium formate production step and a separation step.

1) Carbonation Step

The carbonation step can be represented by Formula 1 below, wherein ammonium bicarbonate is formed by the reaction of carbon dioxide, water and amine.

[Formula 1]

$$NR_1R_2R_3 + CO_2 + H_2O \rightleftharpoons (HNR_1R_2R_3) + (HCO_3)^-$$

In Formula 1, $NR_1R_2R_3$ is a tertiary amine, and each of $R_1$, $R_2$ and $R_3$ is independently an alkyl group having 1 to 6 carbon atoms, and the sum of the number of carbon atoms contained in the alkyl groups is preferably less than 12. For example, each of $R_1$, $R_2$ or $R_3$ may be independently alkyl groups having 2 or 3 carbon atoms, and the alkyl groups may be linear, branched or cyclic, and may be saturated or unsaturated hydrocarbons. In addition, two of the alkyl groups may be joined together to form a saturated or unsaturated ring with N.

Specifically, for example, tertiary amines that can be used in the present invention include, but are not limited to, triethylamine, tripropylamine, tributylamine, N,N-dimethylbutylamine, N-methylpiperidine, 1-ethylpiperidine, N,N-dimethylpiperazine, dimethylcyclohexylamine, dimethylhexylamine, N-methylpyrrolidine, N-ethylpyrrolidine, dimethylphenethylamine, dimethyloctylamine and the like. Among these, it is preferable to use triethylamine as the tertiary amine because the smaller the number of carbon atoms in the tertiary amine, the more favorable the reaction rate.

In general, the process of preparing calcium formate using the hydrogenation reaction of carbon dioxide is a non-spontaneous reaction, and AG (Gibbs free energy change) has a positive value. However, the present invention can overcome the thermodynamic limitations of the existing carbon dioxide hydrogenation reaction by using a tertiary amine ($NR_1R_2R_3$ of Formula 1) to make the AG (Gibbs free energy change) of the carbon dioxide hydrogenation reaction have a negative value.

In the present invention, it is suitable to use a tertiary amine satisfying a pka (ionization constant) of 6.5 to 14, and preferably having a pka of 9.0 to 12.0. The higher the pka value of the tertiary amine, the more thermodynamically favorable it may be for the preparation of formic acid.

Also, in Formula 1, $(HNR_1R_2R_3)^+(HCO_3)^-$ may be an ammonium salt such as ammonium bicarbonate, and may be present in an aqueous solution. Since tertiary amines can have low solubility in water, the tertiary amines and water can result in liquid-liquid phase separation, which can lead to low reaction efficiency in the subsequent hydrogenation step. However, since the ammonium salt of ammonium bicarbonate generated in the carbonation step can exist as an aqueous solution with water, the present invention introduces such a carbonation step before the hydrogenation step, so that the liquid-liquid phase separation of the reactants in the hydrogenation step can be minimized.

Specifically, in the carbonation step, the carbon dioxide may be supplied as contained in a carbon dioxide-containing gas, and the reaction may be carried out by a process wherein the amine selectively absorbs the carbon dioxide in the carbon dioxide-containing gas.

2) Hydrogenation Step

The hydrogenation step is the process of synthesizing the formic acid precursor, which is represented by Formula 2 below—i.e., the hydrogenation reaction of the ammonium bicarbonate prepared in the carbonation step leads to the formation of a formic acid-amine adduct.

[Formula 2]

$$(HNR_1R_2R_3) + (HCO_3)^- + H_2 \underset{}{\overset{cat.}{\rightleftharpoons}} NR_1R_2R_3{:}HCO_2H + H_2O$$

In Formula 2, $R_1$, $R_2$ and $R_3$ are as defined in Formula 1. And in Formula 2, $NR_1R_2R_3{:}HCO_2H$ is a formic acid-amine adduct, which may be an ammonium salt such as $(HNR_1R_2R_3)^+(HCO_2)^-$(ammonium formate). The formic acid-amine adduct may further comprise a mixture of free amines or free formic acid.

On the other hand, a method for preparing formic acid through a hydrogenation reaction of carbon dioxide efficiently performs the hydrogenation reaction using a catalyst, thereby presenting a commercially utilizable method for preparing formic acid. In particular, since the present invention utilizes a hydrogenation reaction unit in which a catalyst is fixed—that is, a trickle bed reactor in which a heterogeneous catalyst is fixed—the product obtained after the reaction does not contain catalyst components, and accordingly, a catalyst recovery system is not required separately, and the catalyst particles can be prevented from being crushed.

Specifically, a catalyst usable in the present invention can be a catalyst in which the active metal or active metal salt is supported in a porous carrier containing nitrogen or doped with nitrogen. When the active metal or active metal salt is immobilized in a nitrogen-containing carrier, the active component of the catalyst does not elute into the product because the active metal and active metal salt are not soluble in the solvent, so the decomposition reaction of formic acid is inhibited and the yield of formic acid is not reduced. The active metal that can be used in the present invention may be selected from iridium (Ir), ruthenium (Ru) or a mixture thereof, and the active metal salt may include, but is not limited to, a chloride, acetate, acetylacetonate, nitrate, hydroxide, sulfate or sulfide salt of the active metal.

Furthermore, porous carriers that can be used in the present invention include, but are not particularly limited to, a nitrogen-doped porous carbon body, a covalent organic framework (COF) having a frame ligand comprising nitrogen, nitrogen-doped metal oxides or metal nitrides, and any catalyst used in the hydrogenation reaction of carbon dioxide.

When the nitrogen-doped porous carbon body is the carrier, the porous carbon body can be graphene, activated carbon, graphite, carbon nanotubes, etc., and a covalent organic framework (COF) can also be used. A COF is a three-dimensional organic framework that forms a complex with an active metal and has a structure that includes a linker and a frame ligand that forms a cavity with the linker, which can be an active metal salt in which two or more anionic ligands are introduced into the coordination space of the active metal complex. In this case, the linker may be a triazine or heptazine, and preferably includes a triazine linker. The triazine linker is synthesized by triplication of the cyano group (—CN) through ionothermal synthesis, which is simple to prepare, and has the advantage of being covalently bonded, unlike the metal-ligand coordination, so it has good thermal and chemical durability.

The frame ligand may also be a heterocyclic aromatic functional group comprising nitrogen as forming a cavity with said linker. Specifically, for example, the heterocyclic aromatic functional group may be selected from, but not limited to, one or more of pyrene, pyridine, pyrrole, triphenylamine, porphyrin, bipyridine, bipyrrole, phenylpyridine, bipyrimidine, baiimidazole, or derivatives thereof. Among these, it is easy to prepare a COF in which triazine is bound by using bipyridine as a frame ligand, and has excellent catalytic activity.

The anionic ligand in the COF may be an oxyanionic ligand selected from carboxylate, oxalate, carbonate, acetylacetonate or an anionic ligand selected from $Cl^-$, $Br^-$, $I^-$, $SO_4^-$, $CF_3SO_3^-$, $NO_3^-$ and $PF_6^-$. Among these, acetylacetonate binds to the metal in a double bond, which can be modified to a single bond after receiving a hydrogen cation to promote disproportionate decomposition of the hydrogen molecule in the event of a hydrogen molecule splitting within the hydrogenation reaction. This is because the hydrogen cation does not interfere with the active metal-ligand bonding sites (N—N coordination bonds), which can increase the stability and efficiency of the catalyst.

In addition, it is preferable to use Ru as the active metal coordinated with the COF. Ru combines with the hydride generated from the disproportionate decomposition of hydrogen to form Ru—H, which can be more stable than other metals, thus increasing the reaction rate.

In addition, another porous carrier that can be used in the present invention may be a nitrogen-containing metal nitride. Specifically, for example, the metal of the metal nitride may be aluminum (Al), silicon (Si), titanium (Ti), zirconium (Zr) or magnesium (Mg).

As mentioned above, the supported catalysts according to the present invention are not limited to the active metal or active metal salt being supported in a porous carrier containing nitrogen or doped with nitrogen, and porous carriers in which the active metal or active metal salt does not contain nitrogen are also possible.

3) Calcium Formate Production Step

The calcium formate production step is a step of reacting the formic acid-amine adduct and a calcium compound to produce calcium formate and an amine.

In the conventional formic acid production process, it is essential to replace formic acid-amine as the intermediate product with auxiliary bases after hydrogenation of carbon dioxide and distill the adduct compound using multiple distillation columns. However, in the case of reacting formic acid-amine adduct with calcium compounds as in the present invention, the complex distillation process can be replaced with a single evaporation process, which greatly improves the investment and operating costs of the process.

The calcium compounds used in the present invention may be selected from the group consisting of calcium oxide, calcium sulfate and combinations thereof, and may be obtained, for example, from waste lime, Portland cement, seashells, incinerator ash, desulfurized gypsum and combinations thereof.

In particular, calcium oxide (CaO) is found in large quantities in nature in the form of lime and in high proportions in waste products such as the aforementioned waste lime, Portland cement, seashells, incinerator ash and exhaust gas desulfurization process ash. CaO is a highly reactive material, and the addition of CaO to water results in an exothermic reaction that rapidly produces $Ca(OH)_2$. Therefore, the higher the percentage of CaO in the waste, the more reactive it is with water, which increases the cost of disposal.

In one embodiment, a calcium formate preparation reaction, as shown in Formula 3 below, involves the addition of CaO to a formic acid-amine adduct, whereby $Ca^{2+}$ combines with $HCOO^-$ to synthesize calcium formate, and the amine can be isolated.

$$2[HCOO^-][Et3NH^+](aq)+CaO\ (s)\rightarrow \text{Calcium formate}\ (aq)+2Et_3N\ (aq)+H_2O\ (aq) \quad \text{[Formula 3]}$$

In addition, desulfurized gypsum can be used as the calcium compound of the present invention. One example of desulfurized gypsum is boiler desulfurization gypsum, which is produced in large quantities in the desulfurization process required in oil refineries. Desulfurized gypsum discharged from the boiler desulfurization process is a mixture of quicklime (CaO) which can be neutralized and anhydrous gypsum ($CaSO_4$) which can be used as a cement retarder, and is generally composed of CaO (about 30 mol %) and $CaSO_4$ (about 70 mol %). When desulfurized gypsum is reacted with HCOOH, $CaSO_4$ can be isolated due to the difference in reactivity of CaO and $CaSO_4$ with water.

In one embodiment, when the calcium compound used in the present invention is desulfurized gypsum ($CaO@CaSO_4$) comprising calcium oxide and calcium sulfate, calcium sulfate may be further produced along with calcium formate and amine compounds in a calcium formate producing step as shown in Formula 4 below.

$$2[HCOO^-][Et_3NH^+]+CaO@CaSO_4\rightarrow CaSO_4+\text{Calcium formate}+2Et_3N+H_2O \quad \text{[Formula 4]}$$

4) Separation Step

In the separation step, the calcium formate produced in the above calcium formate production step can be separated from the amine, water and any additional calcium sulfate that may be produced.

First, when using desulfurized gypsum (CaO@$CaSO_4$) as the calcium compound, the calcium oxide contained in the desulfurized gypsum reacts with the formic acid-amine adduct to produce calcium formate, and a small amount of unreacted CaO exists as $Ca(OH)_2$(s), which may be less than approximately 0.5% of the initial amount of CaO. In addition, $CaSO_4$ does not participate in the reaction and is present as $CaSO_4$(s), which can be 100% of the initial amount of $CaSO_4$.

In this separation step, the solids $Ca(OH)_2$ and $CaSO_4$ can be separated by filtering, and the filtrate comprises calcium formate (aq), an amine (e.g., $Et_3N$) and water.

The filtrate can be distilled to obtain a calcium formate solid, which can be distilled at 90° C. to 110° C., for example 100° C., to separate amines such as $Et_3N$, and distilled at 120° C. to 140° C., for example 130° C., to separate water to obtain a calcium formate solid.

The method of preparing calcium formate according to the present invention has the advantage of efficiently making calcium formate by recycling the products—for example, unreacted carbon dioxide from the hydrogenation step and amine or water from the carbonation step, the calcium formate production step and the separation step can be recycled and used again in the reaction.

In another aspect, the present invention provides an apparatus for preparing calcium formate, comprising a calcium formate production unit for producing calcium formate and an amine by reacting a formic acid-amine adduct and a calcium compound; and a separation unit for separating the prepared calcium formate.

Using the apparatus for preparing calcium formate of the present invention, the method of preparing the calcium formate of the present invention described above can be carried out.

Thus, in one embodiment, the apparatus for preparing calcium formate of the present invention may comprise a carbonation reaction unit for preparing ammonium bicarbonate by reacting carbon dioxide, amine and water; a hydrogenation reaction unit for preparing a formic acid-amine adduct by reacting the ammonium bicarbonate with hydrogen in the presence of a catalyst; and a separation unit for separating the prepared calcium formate. In this case, said hydrogenation reaction unit is preferably a trickle bed reactor in which a heterogeneous catalyst is fixed.

The apparatus for preparing calcium formate according to the present invention may further comprise an amine storage container for forming an amine aqueous solution by mixing water and amine in front of the carbonation reaction unit. The carbonation reaction unit may be an absorption tower to which a carbon dioxide-containing gas is supplied from the bottom and an amine aqueous solution containing water and amine is supplied from the top, or a homogenizer for forming ammonium bicarbonate by reacting high-purity carbon dioxide with an aqueous amine solution.

The apparatus for preparing calcium formate according to the invention may further comprise, for example, a separator for separating the amine discharged from the carbonation reaction unit and recycling it to the carbonation reaction unit between said carbonation reaction unit and said hydrogenation reaction unit, or a separator for separating unreacted carbon dioxide and hydrogen discharged from the hydrogenation reaction unit and recycling them to the hydrogenation reaction unit between the hydrogenation reaction and a base exchange reaction unit.

Meanwhile, in a separation unit, the calcium formate produced in the calcium formate production unit can be separated from amines, water and any additional calcium sulfate that may be produced. The amine and water separated in the separation unit can be recirculated to the carbonation reaction unit. And calcium sulfate, which is additionally produced when desulfurized gypsum is used as the calcium compound, can be separated by filtering.

The configuration of the apparatus for preparing calcium formate according to one embodiment of the present invention is described in detail.

First, water and amine are injected into an amine storage container, which may result in the formation of an amine aqueous solution or water dispersion in which the amine is homogeneously dispersed in water. The amine aqueous solution is introduced into an absorber or absorption tower.

The absorber is a carbonation reaction unit, where a carbonation step is performed to produce ammonium bicarbonate as shown in Formula 1 above. The upper part of the absorber can be supplied with an aqueous amine solution, and the lower part can be supplied with carbon dioxide-containing gas. The amine aqueous solution can absorb or capture the carbon dioxide in the carbon dioxide-containing gas to produce ammonium bicarbonate. Meanwhile, the carbon dioxide contained in the carbon dioxide-containing gas is captured, and the remaining residual gas can be discharged to the outside from the upper part of the absorber.

The carbon dioxide gas in the carbon dioxide-containing gas is captured by the amine, forming an aqueous solution of ammonium bicarbonate, which can be transported to the hydrogenation reaction unit via a liquid pump.

The concentration of the amine aqueous solution supplied to said absorber is suitable in the range of 0.02 to 7.0 M, preferably in the range of 0.1 to 7.0 M, and even more preferably in the range of 1.0 to 6.5 M. Within this concentration range, there is no phase separation of the amine from the aqueous solution, and the inclusion of suitable water prevents the energy consumption of the separation process described below from becoming excessively high.

Furthermore, the molar ratio of carbon dioxide to amine as a reactant introduced into the absorber may be from 0.1 to 3.0, and preferably from 0.2 to 2.0. This is because a suitable conversion rate of carbon dioxide and production rate of formic acid can be achieved in the above molar ratio range.

As an absorber, a conventional absorption tower used to capture carbon dioxide can be used, and the absorption efficiency can be increased by filling. The absorber can perform the reaction at a pressure of 1 to 50 atmospheres and a temperature of 5 to 150° C., and more preferably at a pressure of 1 to 20 atmospheres and a temperature of 5 to 80° C.

The ammonium bicarbonate and hydrogen formed in the absorber may also be introduced into the homogenizer. The homogenizer may also be a carbonation reaction unit, in which the bicarbonation reaction of Formula 1 may further proceed. The homogenizer may simultaneously serve as a preheater, and the temperature of the homogenizer may be in the range of 20 to 200° C., preferably in the range of 50 to 150° C. In this temperature range, the carbonylation reaction of Formula 1 can be carried out sufficiently, and the amine may not be degraded.

The pressure of the homogenizer may also be in the range of 20 to 300 atmospheres, with a range of 40 to 200 atmospheres being efficient. The pressure in the homogenizer can be kept the same as the pressure in the hydrogenation reaction unit, and within this range, a suitable reaction rate of the hydrogenation process can be obtained.

The mixture comprising ammonium bicarbonate, hydrogen and unreacted carbon dioxide is supplied to the hydrogenation reaction unit, wherein the formic acid precursor synthesis process represented by the above Formula 2 can be carried out. That is, the formic acid precursor synthesis process reacts ammonium bicarbonate and hydrogen on a fixed heterogeneous catalyst to carry out a hydrogenation reaction, and a formic acid-amine adduct is formed by hydrogenation.

The hydrogenation reaction unit is a reaction unit suitable for a gas-liquid reaction by a heterogeneous catalyst depending on the reaction conditions, and a gas-liquid mixed-phase reaction part with a fixed catalyst can be used. In the present invention, the efficiency of the process can be increased by introducing, for example, a trickle bed reactor (TBR).

The trickle bed reaction unit is a simple type of reaction unit used in a catalytic reaction in which liquid and gaseous fluids flow in a bed filled with catalyst particles. The liquid phase can flow downward, and the gas phase can flow downward and be co-current. However, it is not limited to this, and the gas phase can also be countercurrent, flowing upwards in the opposite direction to the liquid phase. In the present invention, by using a trickle bed reaction unit, the reactivity can be improved by increasing the contact area between the catalyst and the reactant. In addition, unlike the stirred reactor, the trickle bed reactor does not require a catalyst recovery device. Therefore, additional processes such as separation by a separate device or addition of additional solvent may not be required to recover the catalyst. Furthermore, since the catalyst particles are not crushed, the product may not contain any catalyst components, which may result in a lower yield of formic acid, which is beneficial.

In the present invention, ammonium bicarbonate, hydrogen and carbon dioxide obtained from the absorber are introduced into the hydrogenation reaction unit, and a three-component reaction of liquid (ammonium bicarbonate)-gas (hydrogen and carbon dioxide)-solid (catalyst) is performed. If the bicarbonation reaction shown in Formula 1 is not carried out in the absorber and the reactants amine, water, hydrogen and carbon dioxide are simultaneously introduced into the hydrogenation reaction unit, a four-component reaction of liquid (water)-liquid (tertiary amine aqueous solution)-gas (hydrogen and carbon dioxide)-solid (catalyst) may be carried out, as amine is insoluble in water. As a result, the liquid-liquid phase separation of the reactants may occur, making contact with the catalyst difficult, and the reaction rate may be problematic. However, the present invention can control that the liquid-liquid phase separation of the reactants does not occur through the carbonation step according to Formula 1 above. Thus, by further including the carbonation step prior to the hydrogenation step, the reaction rate can be accelerated and the reaction efficiency can be increased.

Furthermore, phase separation between solutions of the reactants may occur depending on the concentration conditions of the amine represented in Formula 1 above. Thus, in order to prevent the occurrence of phase separation, the concentration of the aqueous solution of the tertiary amine may be adjusted as described above.

Furthermore, a molar ratio of hydrogen to carbon dioxide in the range of 0.4 to 10 is suitable, preferably 0.5 to 3, and even more preferably 0.8 to 2.0. A molar ratio in this range is economical and may be advantageous in terms of energy consumption due to the conversion rate of carbon dioxide.

The temperature of the hydrogenation reaction unit is preferably in the range of 40 to 200° C., in which the reaction can be carried out at a suitable reaction rate and the tertiary amine is not degraded. In addition, the pressure of the hydrogenation reaction unit is in the range of 20 to 300 atmospheres, in which the reaction can be carried out at a suitable reaction rate and is economical.

The mixture of formic acid-amine adduct and unreacted gas is introduced into a gas-liquid separator to separate the liquid product from the unreacted gas, and the unreacted gas, carbon dioxide or hydrogen can be recirculated from the separator through a homogenizer to the hydrogenation reaction unit.

The pressure in the separator may be from 20 to 300 atmospheres, which may be maintained at the same pressure as the hydrogenation reaction unit. Furthermore, the temperature of the separator is 40 to 200° C., which is above the boiling point of carbon dioxide, so that carbon dioxide can be separated from the formic acid-amine adduct, and the separated carbon dioxide gas can be recirculated.

The formic acid-amine adduct separated from the separator is introduced into the distiller. The formic acid-amine adduct is distilled, and a formic acid-amine adduct with concentrated formic acid can be formed in the lower part of the distiller. At this time, the amine can be separated in the upper part of the distiller, which can be recirculated to the absorber in the form of an aqueous solution through an amine storage container.

In the formic acid-amine adduct, the molar ratio of formic acid to amine is in the range of 0.1 to 2.0. Furthermore, for formic acid-amine adducts formed by distillation of the formic acid-amine adducts, wherein the formic acid is concentrated, the molar ratio of formic acid to amine is in the range of 1.0 to 3.0.

In the calcium formate production unit, the formic acid-amine adduct and the calcium compound can be reacted to produce calcium formate and amine. After adding the calcium compound to the formic acid-amine adduct, calcium formate can be synthesized by stirring at 20 to 50° C. for 1 to 10 minutes.

In one embodiment, when desulfurized gypsum ($CaO@CaSO_4$) is used as the calcium compound, the calcium oxide contained in the desulfurized gypsum reacts with the formic acid-amine adduct to produce calcium formate, and a small amount of unreacted CaO is present as $Ca(OH)_2$(s), which may be less than approximately 0.5% of the amount of CaO initially introduced. In addition, $CaSO_4$ does not participate in the reaction and is present as $CaSO_4$(s), which can be 100% of the initial $CaSO_4$ amount.

In the separation unit, the solid $Ca(OH)_2$ and $CaSO_4$ can be separated by filtering, and the filtrate includes calcium formate (aq), an amine (e.g., $Et_3N$) and water. The filtrate can be distilled to obtain a calcium formate solid, wherein an amine such as $Et_3N$ can be separated by distillation at 90° C. to 110° C., for example 100° C., and water can be separated by distillation at 120° C. to 140° C., for example 130° C., to obtain a calcium formate solid.

The present invention is explained in more detail through the following Examples and Comparative Examples. However, the scope of the present invention is not limited thereby in any manner.

Examples

Figure 3:
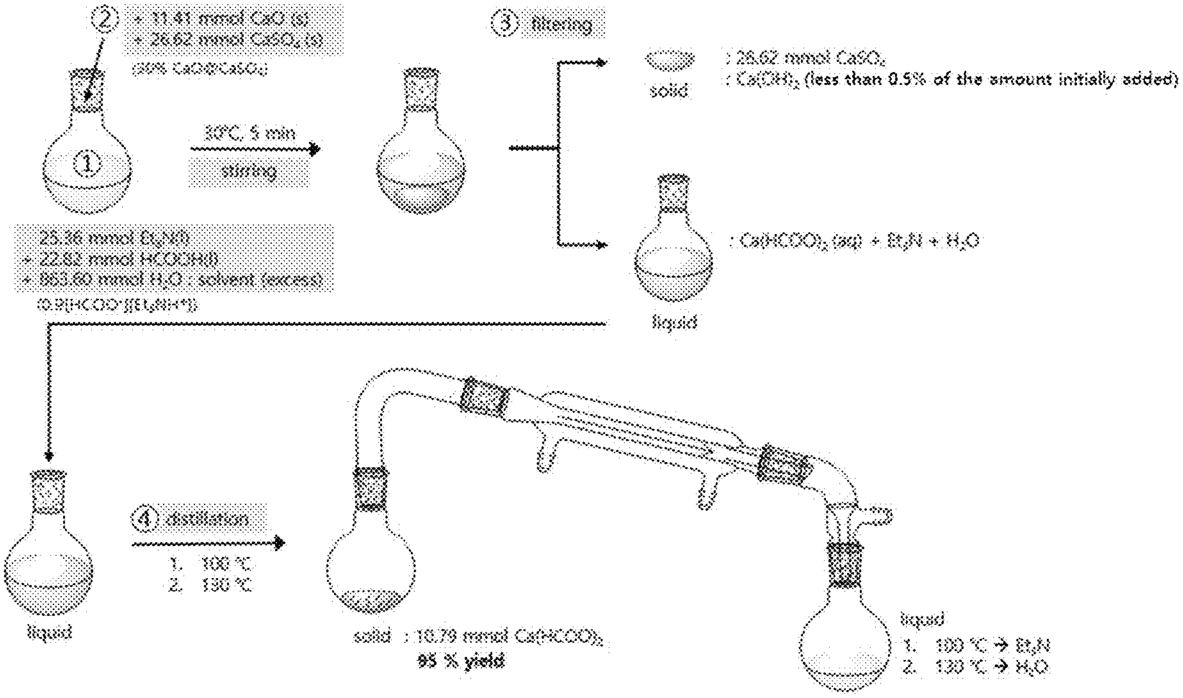
FIG. 3 is a schematic illustration of a method for preparing calcium formate according to an embodiment of the present invention as performed in a laboratory.

The method for preparing calcium formate of the present invention was carried out in the laboratory as follows, and the preparation process is shown schematically in FIG. 3.

(1) First, to a 50 mL RB was added triethylamine ($Et_3N$, 25.36 mmol), formic acid (22.82 mmol) and $H_2O$ (863.60 mmol).

A solution of 0.7[$HCOO^-$][$Et_3NH^+$] and 0.3[$HCO_3^-$][$Et_3NH^+$] were stirred at 90° C. for 2 hours to decompose bicarbonate ($HCO_3^-$) into $CO_2$, resulting in a 0.9[$HCOO^-$][$Et_3NH^+$] solution. (The change in composition occurs because $Et_3N$ (triethylamine) is blown off during the heating process.)

(2) To the above solution, CaO (11.41 mmol) and $CaSO_4$ (26.62 mmol) (assuming desulfurized gypsum as a calcium compound) were slowly added and stirred at 30° C. for 5 min.

Among the CaO@$CaSO_4$ added, a small amount of unreacted CaO was present as $Ca(OH)_2$(s) (less than 0.5% of the amount of CaO initially added), and $CaSO_4$ was present as $CaSO_4$(s) since it does not participate in the reaction (100% of the amount of $CaSO_4$ initially added). Calcium formate (aq), $Et_3N$ and $H_2O$ were present in solution.

(3) Filtering separated the white solids $Ca(OH)_2$ and $CaSO_4$.

(4) The filtrate was distilled at 100° C. and 130° C. to separate $Et_3N$ and $H_2O$ and obtain a white calcium formate solid. At 100° C., $Et_3N$ was isolated, and at 130° C., $H_2O$ was isolated, and finally calcium formate was obtained.

As can be seen from the above experiments, the method for preparing calcium formate of the present invention can prepare and separate calcium formate in a simple process by excluding complex separation processes and auxiliary bases required in the conventional formic acid preparation process.

Furthermore, when using waste desulfurized gypsum (CaO@$CaSO_4$) as a calcium compound, the $CaSO_4$ separated from CaO@$CaSO_4$ can be used as a separate resource, which is very useful industrially.

What is claimed is:

1. A method for preparing calcium formate, comprising a preparation step of preparing a formic acid-amine adduct using a hydrogenation reaction of carbon dioxide;

a calcium formate production step of reacting the formic acid-amine adduct and a calcium compound to produce calcium formate and an amine and a separation step of separating the prepared calcium formate, wherein the calcium compound includes calcium oxide and calcium sulfate, and wherein in the calcium formate production step, calcium sulfate is further produced together with calcium formate and an amine compound.

2. The method for preparing calcium formate according to claim 1, wherein the step of preparing the formic acid-amine adduct comprises a carbonation step of preparing ammonium bicarbonate by reacting carbon dioxide, amine and water; and a hydrogenation step of reacting the ammonium bicarbonate with hydrogen in the presence of a catalyst to form the formic acid-amine adduct.

3. The method for preparing calcium formate according to claim 2, wherein the amine is a tertiary amine represented by $NR_1R_2R_3$, each of $R_1$, $R_2$ and $R_3$ is independently an alkyl group having 1 to 6 carbon atoms, and the sum of the number of carbon atoms contained in the alkyl groups is less than 12.

4. The method for preparing calcium formate according to claim 3, wherein the tertiary amine is one or more selected from the group consisting of triethylamine, tripropylamine, tributylamine, N,N-dimethylbutylamine, N-methylpiperidine, 1-ethylpiperidine, N,N-dimethylpiperazine, dimethylcyclohexylamine, dimethylhexylamine, N-methylpyrrolidine, N-ethylpyrrolidine, dimethylphenethylamine and dimethyloctylamine.

5. The method for preparing calcium formate according to claim 2, wherein the catalyst is a heterogeneous catalyst in which an active metal or an active metal salt is supported in a porous carrier.

6. The method for preparing calcium formate according to claim 5, wherein the active metal is selected from iridium (Ir), ruthenium (Ru) or a mixture thereof.

7. The method for preparing calcium formate according to claim 5, wherein the porous carrier is selected from a nitrogen-containing or nitrogen-doped porous carbon body, a nitrogen-doped metal oxide, a nitrogen-doped metal nitride or a covalent organic framework (COF) having a frame ligand containing nitrogen.

8. The method for preparing calcium formate according to claim 2, wherein in the carbonation step, carbon dioxide is supplied as contained in the carbon dioxide-containing gas, and the amine selectively absorbs the carbon dioxide in the carbon dioxide-containing gas.

9. The method for preparing calcium formate according to claim 2, wherein unreacted carbon dioxide discharged from the hydrogenation step and amine or water discharged from the carbonation step, the calcium formate production step and the separation step are recycled and used.

* * * * *